United States Patent
Dunsmore et al.

(10) Patent No.: US 6,856,620 B1
(45) Date of Patent: Feb. 15, 2005

(54) METHOD AND SYSTEM FOR TRANSPORTING PACKET-SWITCHED CONTROL TRAFFIC IN AN OPTICAL NETWORK

(75) Inventors: Richard J. Dunsmore, McKinney, TX (US); Man W. Fong, Allen, TX (US); Linda W. Dunbar, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 967 days.

(21) Appl. No.: 09/658,232

(22) Filed: Sep. 8, 2000

(51) Int. Cl.[7] .................................................. H04J 3/16
(52) U.S. Cl. ........................ 370/389; 370/469; 370/395
(58) Field of Search ................................ 370/391, 389, 370/392, 437, 474, 465, 524, 532, 535, 537, 538, 469, 395, 395.51, 401, 395.5, 360

(56) References Cited

U.S. PATENT DOCUMENTS 6,222,848 B1 * 4/2001 Hayward et al. ........... 370/412
6,496,519 B1 * 12/2002 Russell et al. .............. 370/465
6,594,279 B1 * 7/2003 Nguyen et al. ............. 370/468
6,788,681 B1 * 9/2004 Hurren et al. .............. 370/389

OTHER PUBLICATIONS

Bellcore, "Synchronous Optical Network (SONET) Transport Systems: Common Generic Criteria", Generic Requirements, GR–253–CORE, Issue 2, Dec. 1995 with Revision 2. Jan. 1999, 788 pages.

\* cited by examiner

*Primary Examiner*—Wellington Chin
*Assistant Examiner*—Brenda Pham
(74) *Attorney, Agent, or Firm*—Baker Botts L.L.P.

(57) ABSTRACT

A method for transporting packet-switched control traffic in an optical network includes receiving a packet-switched datagram comprising a destination address. The method also includes identifying a destination Open Systems Interconnection (OSI) address of a destination network element in the optical network based on the destination address of the datagram. In addition, the method includes generating an OSI packet comprising the datagram and the destination OSI address, and transmitting the OSI packet on the optical network in an OSI channel of a Synchronous Optical Network (SONET) frame.

33 Claims, 4 Drawing Sheets

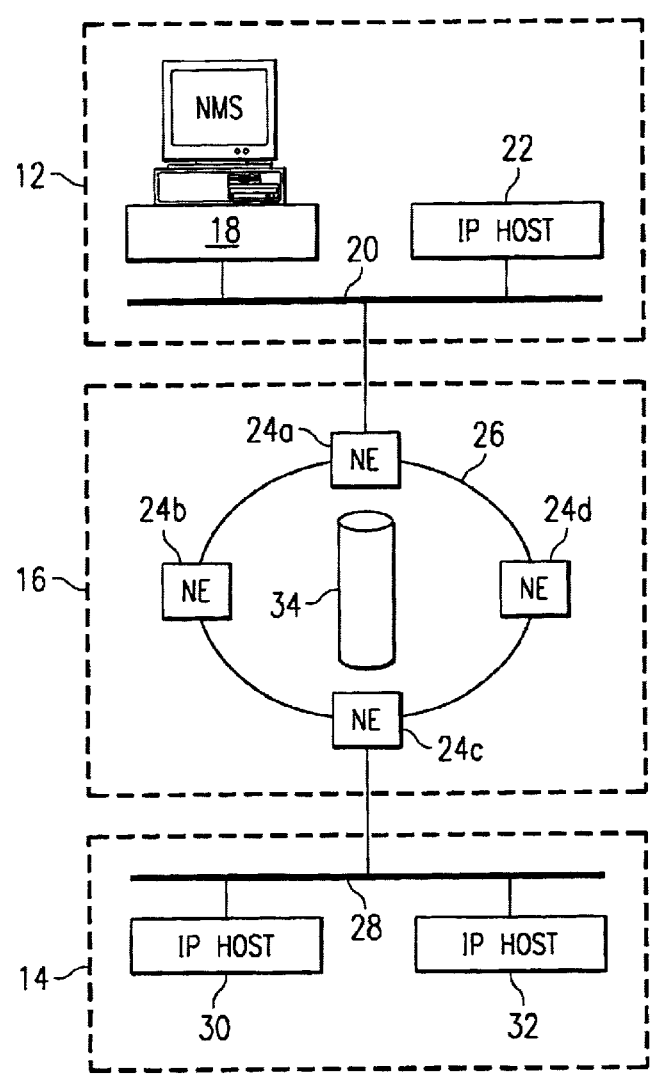
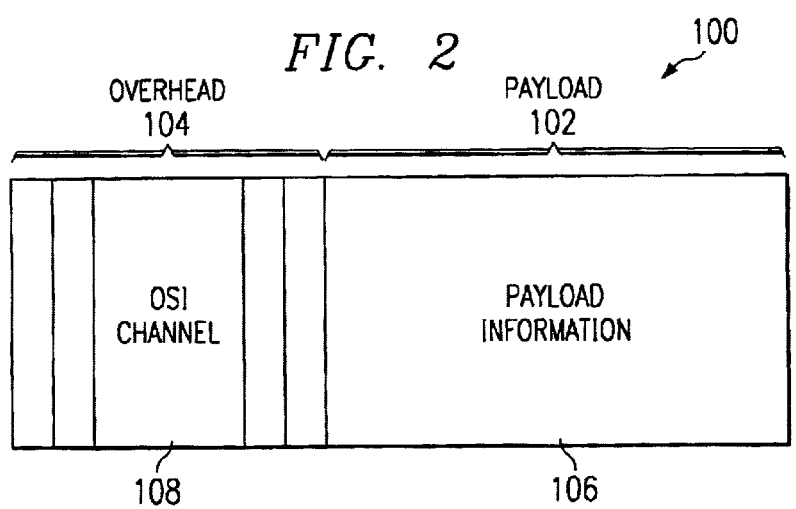

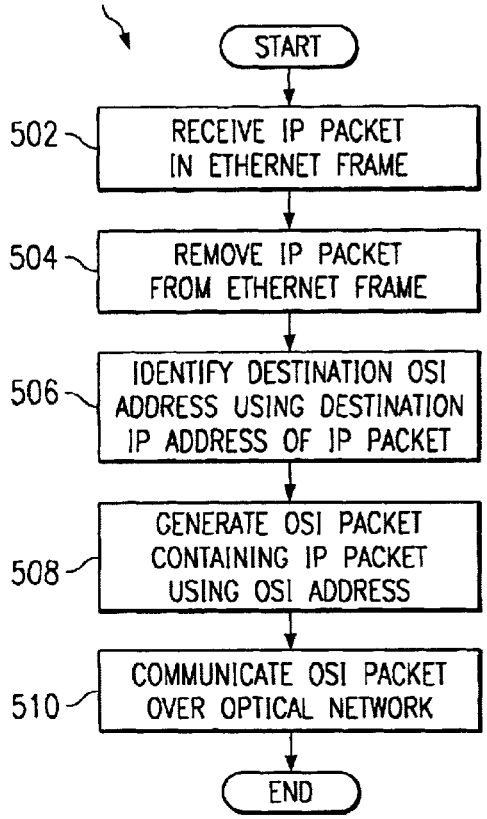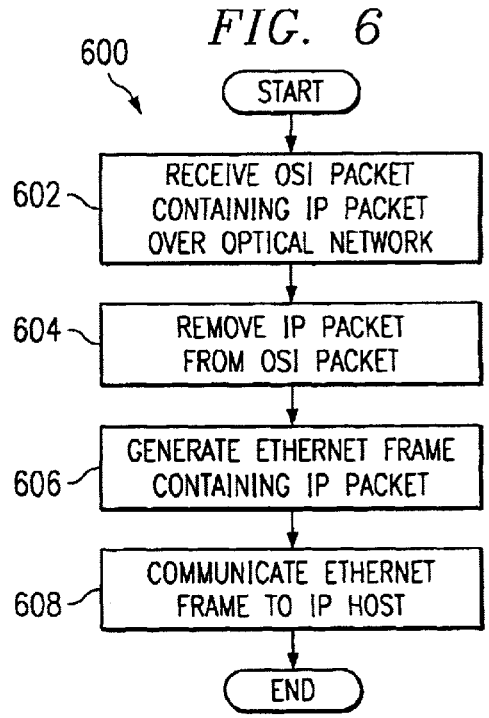

METHOD AND SYSTEM FOR TRANSPORTING PACKET-SWITCHED CONTROL TRAFFIC IN AN OPTICAL NETWORK

TECHNICAL FIELD OF THE INVENTION

This invention relates generally to optical communications systems, and more particularly to a method and system for transporting packet-switched control traffic in an optical network.

BACKGROUND OF THE INVENTION

Communications systems are rapidly expanding in order to increase the amount of information that may be transported through those systems. These communications systems often include different types of networking equipment, such as optical networking equipment and packet-switched communications equipment. Optical networks, such as a Synchronous Optical Network (SONET), often include multiple network elements arranged in a ring. Each network element typically communicates directly with two other network elements in the ring, one network element in each direction of the ring. When one network element needs to communicate information to another network element, the first network element communicates the information to the second network element through any intermediate network elements in the ring.

Elements in the packet-switched networks typically communicate with each other and exchange packets of information. Unlike SONET networks, elements in the packet-switched network may communicate directly with multiple elements in the network. In addition, optical networks and packet-switched networks often use different protocols to transfer information. SONET networks often use the SONET protocol suite, which includes the Open Systems Interconnection (OSI) protocol suite, while packet-switched networks often use the Internet Protocol (IP) suite.

As a result, it is often difficult for a packet-switched network to communicate packet-switched traffic to another network over an optical network. The different protocols make communication of packet-switched traffic through the optical network difficult at best. Transporting the packet-switched traffic through the optical network may not be possible, which prevents other networks from communicating through the optical network.

Prior approaches to facilitating communication over an optical network have typically focused on transporting packet-switched traffic through the optical network using proprietary protocols. A problem with these approaches is that network elements from different vendors often could not be used in the same optical network. Because the prior approaches often use proprietary solutions, the network elements manufactured by one vendor may not be able to communicate effectively with the network elements of other manufacturers. As a result, adding or replacing network elements in the optical network is often difficult. Before adding or replacing an element in the optical network, the network operator usually needs to verify that the element being placed in the network can effectively communicate with existing network elements. If the new element cannot, the network operator often could not use the new element in the network. This limits the available network elements that may be placed in the network.

Another problem with these approaches is that adding the ability to transport packet-switched traffic typically requires upgrading or replacing many of the network elements in legacy optical networks. To transport packet-switched traffic, each network element in the optical network typically needs to understand the proprietary protocol. To add this functionality to the network elements, each network element typically needs to be upgraded or replaced. As a result, the cost of providing this functionality in the optical network increases.

Another prior approach facilitates the communication of Simple Network Management Protocol (SNMP) information over a SONET network. The SNMP information is transported in SONET frames over the optical network. In particular, the information is carried in section data communications channel bytes in the SONET frames.

SUMMARY OF THE INVENTION

The present invention provides an improved method and system for transporting packet-switched control traffic in an optical network that reduce or eliminate at least some of the shortcomings of previous systems and methods. In particular, the invention encapsulates packet-switched traffic within OSI packets in a SONET overhead and communicates the OSI packets through an optical network using standard protocols.

In one embodiment of the invention, a network element for transporting packet-switched control traffic in an optical network includes an interface operable to receive a packet-switched datagram comprising a destination address. The network element also includes a tunneling module coupled to the interface. The tunneling module is operable to identify a destination Open Systems Interconnection (OSI) address of a destination network element in the optical network based on the destination address of the datagram. The tunneling module is also operable to generate an OSI packet comprising the datagram and the destination OSI address. In addition, the network element includes an optical interface coupled to the tunneling module and operable to transmit the OSI packet on the optical network in an OSI channel of a Synchronous Optical Network (SONET) frame.

In a particular embodiment of the invention, the tunneling module is operable to identify the destination OSI address of the destination network element based on the destination address of the datagram by accessing a table. The table includes a plurality of datagram addresses and a plurality of OSI addresses, where each datagram address is associated with one of the OSI addresses. The tunneling module is also operable to compare the destination address of the datagram with at least one of the datagram addresses in the table. The tunneling module is further operable to identify the datagram address in the table that matches the destination address of the datagram. In addition, the tunneling module is operable to retrieve the OSI address associated with the matching datagram address in the table.

In another embodiment of the invention, a method for transporting packet-switched control traffic in an optical network includes receiving a packet-switched datagram comprising a destination address. The method also includes identifying a destination Open Systems Interconnection (OSI) address of a destination network element in the optical network based on the destination address of the datagram. In addition, the method includes generating an OSI packet comprising the datagram and the destination OSI address, and transmitting the OSI packet on the optical network in an OSI channel of a Synchronous Optical Network (SONET) frame.

Numerous technical advantages can be gained through various embodiments of the invention. Various embodiments of the invention may exhibit none, some, or all of the following advantages. For example, in one embodiment of the invention, a system is provided that allows packet-switched traffic to be communicated over an optical network. In particular, the packet-switched traffic may be placed into Open Systems Interconnection (OSI) packets, and the OSI packets may be transported between network elements in the optical network. This allows the packet-switched traffic to flow through the optical network.

Another advantage of some embodiments of the invention is that the use of proprietary protocols to transport packet-switched traffic may be reduced or eliminated in the optical network. As a result, network elements from different vendors may be used in the same optical network. Because the network elements may not be required to understand proprietary protocols to transport IP traffic in the optical network, the network elements manufactured by one vendor may be able to communicate more effectively with the network elements of other manufacturers. Because of this, adding or replacing network elements in the optical network may be simpler. The network operator may not need to verify that the element being placed in the network can understand proprietary protocols used by existing network elements to transport IP traffic.

In addition, some embodiments of the invention may be integrated more easily with legacy optical networks. For example, in one embodiment, one network element in the optical network may communicate with a first network, and another network element may communicate with a second network. In this embodiment, the network elements communicating with the first and second networks recognize and process the packet-switched traffic, and the packet-switched traffic is transported transparently across the remaining network elements in OSI packets. The remaining network elements in the optical network may not need to recognize that packet-switched traffic is contained in the OSI packets. As a result, in this embodiment, only two network elements may need to process packet-switched traffic. This helps to reduce the cost of providing this functionality in the optical network by reducing the number of network elements to be upgraded or replaced.

Other technical advantages are readily apparent to one of skill in the art from the attached figures, description, and claims.

BRIEF DESCRIPTION OF THE DRAWINGS

For a more complete understanding of the present invention and the advantages thereof, reference is now made to the following descriptions taken in connection with the accompanying drawings, in which:

FIG. 1 is a block diagram illustrating a communications system for transporting packet-switched traffic in an optical network in accordance with one embodiment of the invention;

FIG. 2 is a block diagram illustrating a Synchronous Optical Network (SONET) frame in the system of FIG. 1 in accordance with one embodiment of the invention;

FIGS. 4a and 4b are block diagrams illustrating tunneling tables in the system of FIG. 3 in accordance with one embodiment of the invention;

FIG. 5 is a flow diagram illustrating a method for transmitting encapsulated packet-switched traffic through an optical network in accordance with one embodiment of the invention;

FIG. 6 is a flow diagram illustrating a method for receiving encapsulated packet-switched traffic in an optical network in accordance with one embodiment of the invention.

DETAILED DESCRIPTION OF THE INVENTION

Figure 3:
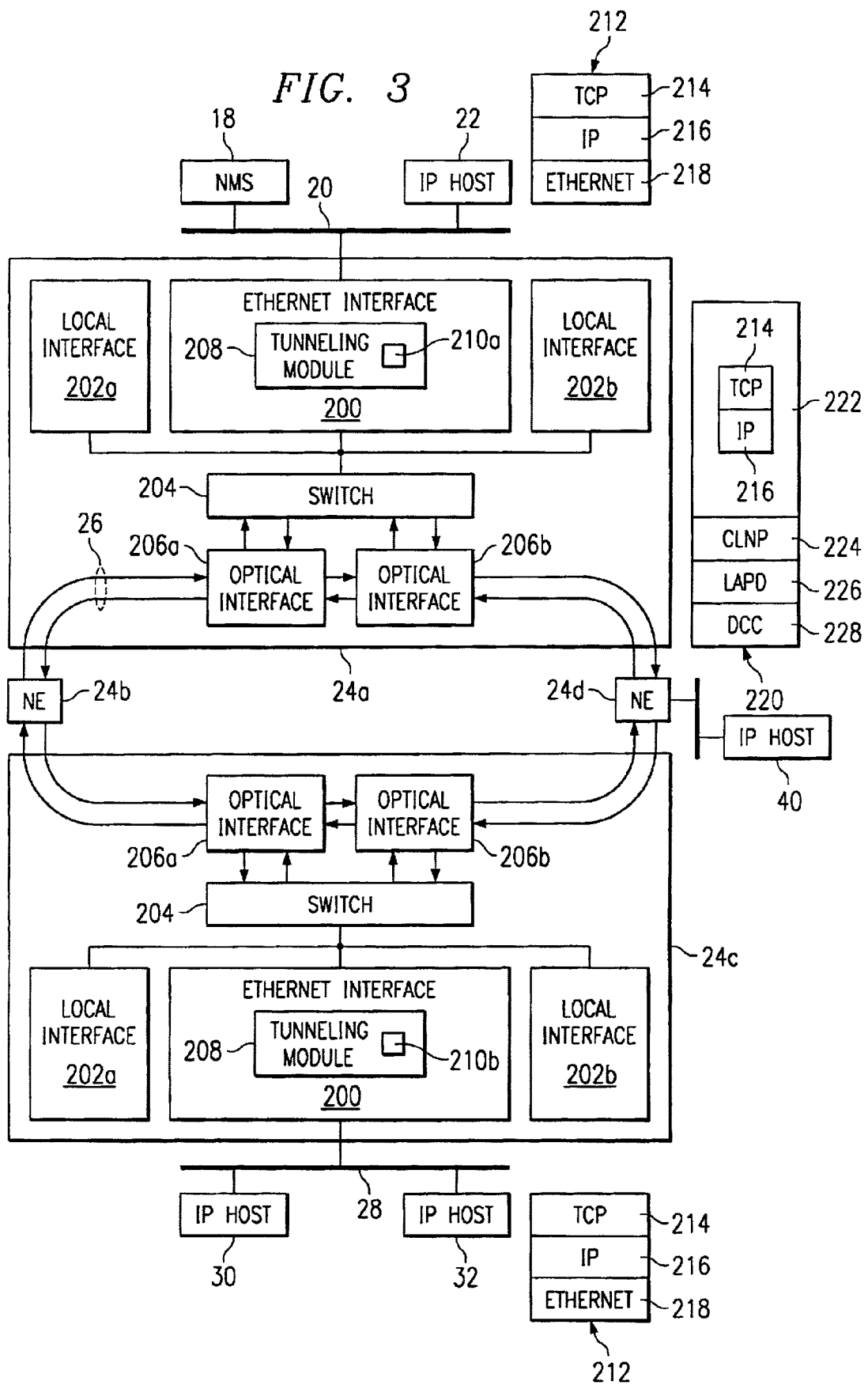
FIG. 3 is a block diagram illustrating details of the system of FIG. 1 in accordance with one embodiment of the invention.

FIG. 1 is a block diagram illustrating a communications system 10 for transporting packet-switched traffic in an optical network 16 in accordance with one embodiment of the invention. In the illustrated embodiment, system 10 includes a first packet-switched network 12, a second packet-switched network 14, and an optical network 16. Other embodiments of system 10 may be used without departing from the scope of the present invention.

In one aspect of operation, optical network 16 includes a plurality of network elements (NE) 24 arranged in a ring. In one embodiment, optical network 16 comprises a Synchronous Optical Network (SONET) ring. In this embodiment, network elements 24 communicate using the SONET protocol suite, which includes the Open Systems Interconnection (OSI) protocol suite, and network elements 24 exchange SONET frames over communication links 26. First packet-switched network 12 and second packet-switched network 14 may use a packet-switched protocol, such as the Internet Protocol (IP) suite, to communicate. To facilitate communication between first packet-switched network 12 and second packet-switched network 14, network elements 24a and 24c are operable to receive packet-switched datagrams and to place the packet-switched datagrams in the SONET frames. Network elements 24a and 24c are also operable to communicate the SONET frames containing the packet-switched datagrams transparently across optical network 16. In addition, network elements 24a and 24c are operable to extract packet-switched datagrams from SONET frames and to communicate the packet-switched datagrams over packet-switched networks 12 and 14. Although the following description describes the invention as it relates to transporting IP packets through an optical network 16, the invention may be used to transport any suitable packet-switched traffic over optical network 16. For example, in another embodiment, the invention may be used to transport Asynchronous Transfer Mode (ATM) cells through optical network 16.

In the illustrated embodiment, first packet-switched network 12 includes a network management station (NMS) 18, a local area network (LAN) 20, and an IP host 22. Network management station 18 is coupled to local area network 20. In this document, the term "couple" refers to any direct or indirect communication between two or more elements in system 10, whether or not those elements are in physical contact with one another. Network management station 18 manages the operation of components in first packet-switched network 12, such as IP host 22. This may include, for example, network management station 18 issuing instructions to IP host 22 to perform particular tasks or to update network management station 18 on the status of IP host 22. The instructions are usually contained in IP packets that are communicated from network management station 18 over local area network 20.

Network management station 18 may also manage the operation of components in second packet-switched network 14 and/or optical network 16, such as network elements 24 and IP hosts 30 and 32. This may allow, for example, remote management of distributed networks through optical network 16. In this embodiment, network management station 18 communicates management and control information in IP packets over local area network 20 to optical network 16, and optical network 16 forwards the IP packets to the network element 16 or IP host 30 or 32. Network management station 18 may comprise any hardware, software, firmware, or combination thereof operable to manage first packet-switched network 12, second packet-switched network 14, and/or optical network 16 using any suitable protocol. In one embodiment, network management station 18 comprises a SUN workstation using the Simple Network Management Protocol (SNMP).

Local area network 20 is coupled to network management station 18, IP host 22, and optical network 16. Local area network 20 transports IP packets between different network addresses in local area network 20. For example, local area network 20 may transport IP packets containing management information between network management station 18 and optical network 16. Local area network 20 may comprise any suitable packet network operable to transport IP packets.

IP host 22 is coupled to local area network 20. IP host 22 may provide any suitable functionality in first packet-switched network 12, such as routing or database functionality. IP host 22 may also be managed by network management station 18. In one embodiment, IP host 22 may be managed using IP-based management communications. For example, IP host 22 may communicate with network management station 18 over local area network 20 and exchange management information in IP packets. IP host 22 may comprise any suitable computing or communication device, such as a workstation operable to execute applications for a user. IP host 22 could also comprise a server, router, or other suitable computing device in first packet-switched network 12.

In the illustrated embodiment, second packet-switched network 14 includes local area network 28, IP host 30, and IP host 32. Other embodiments of second packet-switched network 14 may be used without departing from the scope of the present invention. Local area network 28 is coupled to optical network 16, IP host 30, and IP host 32. Local area network 28 transports IP packets between different network addresses in local area network 28. For example, local area network 28 may transport IP packets containing management information between optical network 16 and IP host 30 or IP host 32. Local area network 28 may comprise any suitable packet network operable to transport IP packets.

IP hosts 30 and 32 are coupled to local area network 28. IP hosts 30 and 32 may provide any suitable functionality in second packet-switched network 14, such as routing or database functionality. IP hosts 30 and 32 may also be managed by network management station 18. In one embodiment, IP hosts 30 and 32 may be managed using IP-based management communications. For example, IP host 30 and 32 may communicate with network management station 18 and exchange management information in IP packets. IP hosts 30 and 32 may comprise any suitable computing or communication devices, such as workstations, servers, or routers.

Optical network 16 is coupled to first packet-switched network 12 and second packet-switched network 14. In the illustrated embodiment, optical network 16 includes a plurality of network elements 24a–24d that communicate with one another over communication links 26. In the illustrated embodiment, network elements 24 are arranged in a SONET ring. In this embodiment, each network element 24 is coupled to two other network elements 24, one in each direction along the SONET ring. When one network element 24a wishes to communicate information to another network element 24c, network element 24a communicates the information through the SONET ring in one or more SONET frames. An intermediate network element 24b or 24d between the transmitting network element 24a and receiving element 24c forwards the SONET frames along the SONET ring to the next network element 24. When the SONET frames arrive at the receiving network element 24c, the frames drop out of the SONET ring and are no longer forwarded to another network element 24. One embodiment of network element 24 is shown in FIG. 3, which is described below.

Communication links 26 couple network elements 24. Communication links 26 may facilitate unidirectional or bi-directional communication between network elements 24. Communication links 26 may comprise any suitable communication medium operable to facilitate communication between network elements 24. In one embodiment, communication links 26 comprise fiber optic lines, such as OC-3 lines, OC-12 lines, OC-48 lines, OC-192 lines, or the like.

In one aspect of operation, network element 24a is coupled to first packet-switched network 12, and network element 24c is coupled to second packet-switched network 14. Network elements 24a and 24c facilitate the transport of IP packets over optical network 16. For example, network element 24a may receive an IP packet from first packet-switched network 12. Network element 24a encapsulates the IP packet, placing the IP packet in an OSI channel in SONET frames which are communicated over the SONET ring to network element 24c. Network element 24c receives the encapsulated IP packet in the OSI channel and extracts the IP packet from the SONET frames. If the IP packet was destined for network element 24c, network element 24c processes the packet. If the IP packet was destined for an element in second packet-switched network 14, network element 24c communicates the IP packet to second packet-switched network 14. Similarly, network element 24c may receive an IP packet from second packet-switched network 14, encapsulate the packet in the OSI channel in the SONET frames, and communicate the SONET frames to network element 24a. Network element 24a extracts the IP packet from the OSI channel and communicates the packet to first packet-switched network 12. In a particular embodiment, the IP packets transported over optical network 16 contain management information that originates from or is destined for network management station 18. This may allow, for example, network management station 18 to manage and control the operation of IP host 22 in first packet-switched network 12, IP hosts 30 and 32 in second packet-switched network 14, and network elements 24 in optical network 16.

The encapsulated IP packets may be transported transparently between network elements 24a and 24c in optical network 16. Network elements 24b and 24d need not recognize that the SONET frames being communicated over the SONET ring contain encapsulated IP packets. In this embodiment, a tunnel 34 exists between network element 24a and network element 24c. Tunnel 34 represents the starting and end points in optical network 16 where IP packets may enter and leave the SONET ring.

Although FIG. 1 illustrates one embodiment of system 10, numerous changes may be made to system 10 without departing from the scope of the present invention. For example, first packet-switched network 12 and second packet-switched network 14 may include any number of IP hosts, such as workstations, router, servers, or other computing devices. Also, first packet-switched network 12 and second packet-switched network 14 may include any suitable packet network, such as a local area network, a wide area network, a metropolitan area network, and global communications system such as the Internet, or any other suitable communications system or systems at one or more locations. In addition, optical network 16 may include any number of network elements 24, and any number of network elements 24 may be coupled to additional networks or devices. For example, network element 24d may be coupled to an ADTRAN TOTAL ACCESS-3000 (TA-3000) device. Further, any number of tunnels 34 may exist between one network element 24a and other network elements 24b–24d. In one embodiment, a maximum of fifty tunnels 34 may be created between a single network element 24 and other network elements 24. Also, although system 10 has been described as including two packet-switched networks 12 and 14, other networks may be used in system 10. For example, an Asynchronous Transfer Mode (ATM) network may be coupled to a network element 24 in optical network 16. Other changes may be made to system 10 without departing from the scope of the present invention.

FIG. 2 is a block diagram illustrating a Synchronous Optical Network (SONET) frame 100 in the system 10 of FIG. 1 in accordance with one embodiment of the invention. In the illustrated embodiment, SONET frame 100 includes a payload portion 102 and an overhead portion 104.

Payload portion 102 contains payload information 106, which represents the information being transported over the SONET ring in SONET frames 100. Overhead portion 104 typically contains operations, administration, maintenance, and provisioning information used to manage optical network 16 and control the transport of SONET frames 100 in optical network 16. In one embodiment, overhead portion 104 comprises a section overhead portion of SONET frame 100. Additional information about SONET frames 100 may be found in Telcordia Technologies technical reference GR-253-CORE entitled "Synchronous Optical Network (SONET) Transport Systems: Common Generic Criteria."

In the illustrated embodiment, overhead portion 104 includes an OSI channel 108. OSI channel 108 is operable to transport at least a portion of an IP packet between network elements 24 in optical network 16. OSI channel 108 may comprise any byte or bytes in overhead portion 104 of SONET frame 100. In one embodiment, OSI channel 108 comprises section data communications channel (section DCC) bytes D1, D2, and D3. Because multiple SONET frames 100 are communicated between network elements 24, the use of section DCC bytes D1–D3 as OSI channel 108 allows transmission rates of up to 192 kilobits per second over OSI channel 108. Other embodiments of OSI channel 108 may be used without departing from the scope of the present invention.

Before communicating an IP packet on OSI channel 108 in SONET frames 100, network element 24 may encapsulate the IP traffic in one or more OSI packets. An "OSI packet" contains information in a format that is recognizable by network elements 24. In one embodiment, OSI packets comprise Connectionless Network Protocol (CLNP) Packet Data Units (PDUs). Other embodiments may be used without departing from the scope of the present invention.

In one embodiment, OSI channel 108 may not be dedicated solely to transporting IP packets across optical network 16. OSI channel 108 may also transport other information used to manage optical network 16 and control the transport of SONET frames 100 in optical network 16.

For example, section DCC bytes D1, D2, and D3 may carry alarm, control, monitoring, administration, and other OSI information between network elements 24. In one embodiment, OSI channel 108 comprises section DCC bytes D1–D3, and IP packets are inserted into SONET frames 100 when OSI information is not being transported on OSI channel 108. In this embodiment, IP packets receive a lower priority in optical network 16, and IP packets may be inserted into SONET frames 100 when OSI information is not being communicated on OSI channel 108.

In one aspect of operation, OSI channel 108 in SONET frame 100 may carry all or a portion of an IP packet between network elements 24. By placing at least a portion of an IP packet in an OSI packet transported over OSI channel 108, IP packets may be tunneled between network elements 24. Network elements 24 that are between the end points of the tunnel 34 may transport the OSI packets within SONET frames 100 transparently, without knowing that the OSI packets include IP packets.

FIG. 3 is a block diagram illustrating details of the system 10 of FIG. 1 in accordance with one embodiment of the invention. In the illustrated embodiment, IP packets 212 may be communicated over local area networks 20 and 28, and OSI packets 220 may be communicated over optical network 16. IP packets 212 include a transmission control protocol (TCP) portion 214 and an Internet Protocol (IP) portion 216. TCP portion 214 and IP portion 216 may be contained in an Ethernet frame 218. OSI packet 220 includes an IP packet portion 222, a Connectionless Network Protocol (CLNP) portion 224, a Link Access Procedure-D (LAPD) portion 226, and a Data Communications Channel (DCC) portion 228. IP packet portion 222 contains the TCP portion 214 and IP portion 216 of an IP packet 212. Network elements 24a and 24c may receive and convert IP packets 212 into OSI packets 220. Network elements 24a and 24c may also receive and convert OSI packets 220 into IP packets 212. This allows network elements 24a and 24c to tunnel IP packets 212 through optical network 16 in OSI packets 220. Network elements 24b and 24d may transport the OSI packets 220 without knowing that OSI packets 220 contain IP traffic.

IP portion 216 typically includes the destination address of packet 212, which represents the IP address of the element in system 10 that should receive the packet 212. IP addresses in system 10 may be based on any suitable addressing scheme. In one embodiment, system 10 uses the addressing scheme defined in Request for Comment (RFC) 917 entitled "Internet Subnets." Other embodiments may be used without departing from the scope of the present invention.

In the illustrated embodiment, system 10 further includes an IP host 40 coupled to network element 24d. IP host 40 may be the same or similar to IP hosts 22, 30, and/or 32. Also, in the illustrated embodiment, network element 24 includes an Ethernet interface 200, a plurality of additional local interfaces 202, a switch 204, and a plurality of optical interfaces 206. Other embodiments of network element 24 may be used without departing from the scope of the present invention. Also, although the following description describes the operation of network element 24a, the same or similar operations may be performed by other network elements 24 in system 10.

Ethernet interface 200 is coupled to switch 204 and local area network 20. Ethernet interface 200 facilitates communication between network element 24 and local area network 20. Ethernet interface 200 may, for example, receive information over local area network 20, and Ethernet interface 200 communicates the information to switch 204. Ethernet interface 200 may also receive information from switch 204, and Ethernet interface 200 communicates the information over local area network 20.

Ethernet interface 200 may comprise any suitable hardware, software, firmware, or combination thereof operable to facilitate communication between a local area network and switch 204.

In the illustrated embodiment, Ethernet interface 200 includes a tunneling module 208. Tunneling module 208 facilitates the tunneling of IP packets 212 through optical network 16. To tunnel IP packet 212 to another network element 24, tunneling module 208 encapsulates the IP packet 212 in one or more OSI packets 220. This may include, for example, tunneling module 208 placing TCP portion 214 and IP portion 216 of IP packet 212 in IP packet portion 222 of OSI packets 220.

Tunneling module 208 may also address the OSI packet 220, allowing the receiving network element 24 at the other end of a tunnel 34 to receive the OSI packet 220. To address the OSI packet 220, tunneling module 208 determines the OSI address of the network element 24 receiving the OSI packet 220. Tunneling module 208 then places the OSI address of the receiving network element 24 in CLNP portion 224 of OSI packet 220. After that, network element 24 communicates the OSI packet 220 across the SONET ring.

To identify the OSI address of the network element 24 receiving the OSI packet 220, tunneling module 208 contains or otherwise has access to a tunneling table 210. Table 210 includes a list of destination IP addresses and associated OSI addresses. Using the destination IP address in IP packet 212, tunneling module 208 accesses table 210 and determines the OSI address that corresponds to the IP address. Tunneling module 208 uses that OSI address to address OSI packet 220. Embodiments of table 210 are shown in FIGS. 4a and 4b, which are described below.

Before tunneling an IP packet 212 over optical network 16, tunneling module 208 may receive an Address Resolution Protocol (ARP) request. The ARP request may come from the element in network 12, such as network management station 18, that is preparing to communicate IP packet 212 to network element 24. The ARP request may also be generated by a router or other element in network 12. The ARP request may include the destination IP address of packet 212 or some other identifier identifying the destination of IP packet 212. The ARP request may also, for example, request the Media Access Control (MAC) address of the component in system 10 that may route the IP packet 212 to the destination IP address. In one embodiment, tunneling module 208 may receive the request and extract the destination IP address contained in the request. Tunneling module 208 uses the IP address in the ARP request to determine if a tunnel 34 exists between network element 24a and the destination IP address. This may include, for example, accessing table 210 to determine if the IP address in the ARP request is contained in the table. If a tunnel 34 exists between network element 24a and the destination IP address, tunneling module 208 responds to the request by communicating the MAC address of network element 24a to the element in system 10 that generated the ARP request. IP packets 212 are then routed to network element 24a, and tunneling module 208 tunnels the packets 212 over optical network 16.

Tunneling module 208 may comprise logic encoded in any combination of hardware, software, firmware, or other computer processable medium operable to encapsulate IP packets 212 in OSI packets 220. In one embodiment, tunneling module 208 comprises software operable to be executed on a processor. Tunneling table 210 may comprise any of a variety of data structures, arrangements, and/or compilations operable to store and facilitate retrieval of information. Tunneling table 210 may, for example, comprise a random access memory (RAM), a read only memory (ROM), a magnetic computer disk, a CD-ROM, other magnetic or optical storage media, or any other volatile or nonvolatile memory device or devices. Although FIG. 3 illustrates tunneling table 210 as residing within tunneling module 208, tunneling table 210 may reside in any location that is accessible by tunneling module 208.

Local interfaces 202a and 202b are coupled to switch 204. Local interfaces 202 may also be coupled to additional devices, such as ATM networks or devices. Local interfaces 202 may facilitate communication between these additional devices and optical network 16. Local interfaces 202 may comprise any hardware, software, firmware, or combination thereof operable to facilitate communication between switch 204 and the additional devices. For example, local interfaces 202 may comprise an ATM interface or a T1 interface. Although FIG. 3 illustrates network element 24 as including Ethernet interface 200 and two local interfaces 202, any number of interfaces 200 and 202 may be used without departing from the scope of the present invention.

Switch 204 is coupled to Ethernet interface 200, local interfaces 202, and optical interfaces 206. Switch 204 receives information from Ethernet interface 200 and local interfaces 202, and switch 204 communicates the information to an optical interface 206 for transmission over optical network 16. Switch 204 may also receive information from optical interface 206, and switch 204 forwards the information to Ethernet interface 200 or local interface 202. Switch 204 may comprise any hardware, software, firmware, or combination thereof operable to provide switching functionality in network element 24. In one embodiment, switch 204 comprises a multi-protocol switch fabric including a packet switch, such as an ATM switch, and a synchronous switch, such as a Time-Space-Time (TST) switch.

Each optical interface 206 is coupled to switch 204 and another network element 24. Each optical interface 206 is also coupled to the other optical interface 206. Optical interfaces 206 facilitate communication between network elements 24 in optical network 16. Optical interface 206 may, for example, transmit and receive SONET frames 100 over communication links 26 in optical network 16. Optical interface 206 may also receive SONET frames 100 from switch 204, and optical interface 206 communicates the SONET frames 100 to another network element 24 in the SONET ring. Optical interface 206 may comprise any hardware, software, firmware, or combination thereof operable to facilitate communication over communication links 26. Although FIG. 3 illustrates optical interfaces 206 as being operable to communicate in both directions of the SONET ring in optical network 16, optical interfaces 206 could also be operable to communicate in one direction of the SONET ring.

In one aspect of operation, network management station 18 may generate an IP packet 212 for IP host 30. The IP portion 216 of IP packet 212 contains the IP address of the destination IP host 30. The IP packet 212 may be communicated over local area network 20 in an Ethernet frame 218 to network element 24a, and Ethernet interface 200 in network element 24a strips TCP portion 214 and IP portion 216 from the Ethernet frame 218.

Tunneling module 208 generates one or more OSI packets 220 that contain TCP portion 214 and IP portion 216. Tunneling module 208 also accesses table 210, retrieves the OSI address of network element 24c, and addresses OSI packet 220. Network element 24a tunnels the OSI packets to network element 24c through network elements 24b and/or 24d. Network element 24c extracts the TCP portion 214 and IP portion 216 from OSI packet 220, places TCP portion 214 and IP portion 216 in an Ethernet frame 218, and communicates the IP packet 212 to IP host 30.

IP host 30 may generate an IP packet 212 containing a response to the management message from network management station 18. Network element 24c receives the IP packet 212, and tunneling module 208 generates an OSI packet 220 addressed to network element 24a. Network element 24a receives the OSI packet 220, extracts the IP packet 212, and communicates the IP packet 212 to network management station 18.

Although FIG. 3 illustrates tunneling module 208 as residing within Ethernet interface 208, tunneling module 208 could reside at any other suitable location in network element 24. Also, although FIG. 3 illustrates tunneling table 210 as residing within tunneling module 208, tunneling table 210 could reside at any location accessible to tunneling module 208.

FIGS. 4a and 4b are block diagrams illustrating tunneling tables 210 in the system 10 of FIG. 3 in accordance with one embodiment of the invention. FIG. 4a illustrates tunneling table 210a in network element 24a, and FIG. 4b illustrates tunneling table 210b in network element 24c. In the illustrated embodiment, each tunneling table 210 includes a plurality of IP addresses 300 and a plurality of OSI addresses 302. Each IP address 300 is associated with an OSI address 302. Other embodiments of tunneling tables 210 may be used without departing from the scope of the present invention. Also, the contents of tunneling tables 210 shown in FIGS. 4a and 4b are for illustration only. The contents of tunneling tables 210 may be provisioned using any suitable method to provide any desired functionality in system 10. In one embodiment, tables 210 may be provisioned by network management station 18.

In FIG. 4a, tunneling table 210a in network element 24a includes three IP addresses 300 and three OSI addresses 302. When network element 24a receives an IP packet 212, tunneling module 208 may extract the destination IP address in IP packet 212. Tunneling module 208 accesses tunneling table 210a and compares the IP address in packet 212 to at least one of IP addresses 300 in table 210a. If the destination IP address in IP packet 212 matches an IP address 300 in table 210a, tunneling module 208a retrieves the OSI address 302 associated with the matching IP address 300. Tunneling module 208 uses the OSI address 302 to address an OSI packet 220.

In the illustrated embodiment, table 210a includes IP addresses 300 for IP host 30, IP host 32, and IP host 40.

If network management station 18 generates a packet 212 for IP host 30, the packet 212 contains the IP address of IP host 30. Tunneling module 208 extracts the IP address from packet 212 and compares the address to IP addresses 300 in table 210a. Tunneling module 208 determines that the IP address in packet 212 matches entry 304 in table 210a. Tunneling module 208 retrieves the OSI address in entry 306, which is the OSI address of network element 24c.

Tunneling module 208 then addresses and OSI packet 220 to network element 24c, and network element 24a tunnels IP packet 212 to network element 24c. Similarly, if network management station 18 generates a packet 212 for IP host 40, tunneling module 208 determines that the IP address in packet 212 matches entry 308. Tunneling module 208 retrieves the OSI address 302 in entry 310 and addresses OSI packet 220 with the address of network element 24d.

In FIG. 4b, tunneling table 210b in network element 24c includes three IP addresses 300 and three OSI addresses 302. When network element 24c receives an IP packet 212, tunneling module 208 may identify the destination address in IP packet 212, access tunneling table 210b, and compare the IP address from packet 212 to at least one of the IP addresses 300 in table 210b. If the destination address in IP packet 212 matches an IP address 300 in table 210b, tunneling module 208 retrieves the associated OSI address 302 and addresses an OSI packet 220 with the address 302 from table 210b.

In the illustrated embodiment, table 210b includes IP addresses 300 for network management station 18, IP host 22, and IP host 40. If, for example, IP host 30 generates a response to a management message received from network management station 18, the packet 212 contains the IP address of network management station 18. Tunneling module 208 extracts the IP address from packet 212 and compares the address to IP addresses 300 in table 210b. Tunneling module 208 determines that the IP address in packet 212 matches entry 312 in table 210b. Tunneling module 208 retrieves the OSI address in entry 314, which is the OSI address of network element 24a. Tunneling module 208 addresses an OSI packet 220 to network element 24a, and network element 24c tunnels IP packet 212 to network element 24a. Network element 24a forwards the IP packet 212 to network management station 18.

Although FIGS. 4a and 4b illustrate tunneling tables 210 as including four rows of entries, any number of entries may be placed in tunneling tables 210 without departing from the scope of the present invention. In one embodiment, each tunneling table 210 may include up to fifty rows of entries, which allows for the creation of up to fifty tunnels 34 for a network element 24.

FIG. 5 is a flow diagram illustrating a method 500 for transmitting encapsulated packet-switched traffic through an optical network 16 in accordance with one embodiment of the invention. Network element 24 receives an IP packet 212 in an Ethernet frame 218 at a step 502.

This may include, for example, Ethernet interface 200 in network element 24 receiving the Ethernet frame 218 over a local area network. Network element 24 removes the IP packet 212 from the Ethernet frame 218 at a step 504. This may include, for example, Ethernet interface 200 stripping TCP portion 214 and IP portion 216 from the Ethernet frame 218.

Network element 24 identifies a destination OSI address for IP packet 212 at a step 506. This may include, for example, tunneling module 208 extracting the destination IP address from IP portion 216 in packet 212.

This may also include tunneling module 208 accessing table 210, comparing the IP addresses 300 in table 210 with the destination IP address in packet 212, and retrieving the OSI address 302 that is associated with a matching IP address 300. Network element 24 generates an OSI packet 220 at a step 508. This may include, for example, tunneling module 208 generating OSI packet 220 using the TCP portion 214 and IP portion 216 of packet 212 and the OSI address 302 from table 210. Network element 24 communicates the OSI packet 220 over optical network 16 at a step 510. This may include, for example, tunneling module 208 communicating the OSI packet 220 to optical interface 206. This may also include communicating the OSI packet 220 over OSI channel 108 in SONET frames 100.

Although FIG. 5 illustrates one method for communicating IP traffic through optical network 16, other methods may be used without departing from the scope of the present invention. For example, IP packets 212 may be received by a network element 24 without being contained in Ethernet frames 218, and network element 24 need not extract IP packets 212 from Ethernet frames 218.

FIG. 6 is a flow diagram illustrating a method 600 for receiving encapsulated packet-switched traffic in an optical network 16 in accordance with one embodiment of the invention. Network element 24 receives an OSI packet 220 containing IP traffic at a step 602. This may include, for example, network element 24 receiving the OSI packet 220 on OSI channel 108 in SONET frames 100. Network element 24 removes the IP traffic from the OSI packet 220 at a step 604. This may include, for example, tunneling module 208 stripping TCP portion 214 and IP portion 216 from IP packet portion 222 of OSI packet 220.

Network element 24 generates an Ethernet frame 218 containing the IP traffic at a step 606. This may include, for example, placing TCP portion 214 and IP portion 216 in an Ethernet frame 218. Network element 24 communicates the IP packet 212 to the destination address at a step 608. This may include, for example, Ethernet module 200 communicating the IP packet 212 over a local area network.

Although FIG. 6 illustrates one method for receiving IP traffic in optical network 16, other methods may be used without departing from the scope of the present invention. For example, IP packets 212 may be communicated to a destination IP address without being contained in Ethernet frames 218, and network element 24 need not place the IP packets 212 in Ethernet frames 218.

Figure 7:
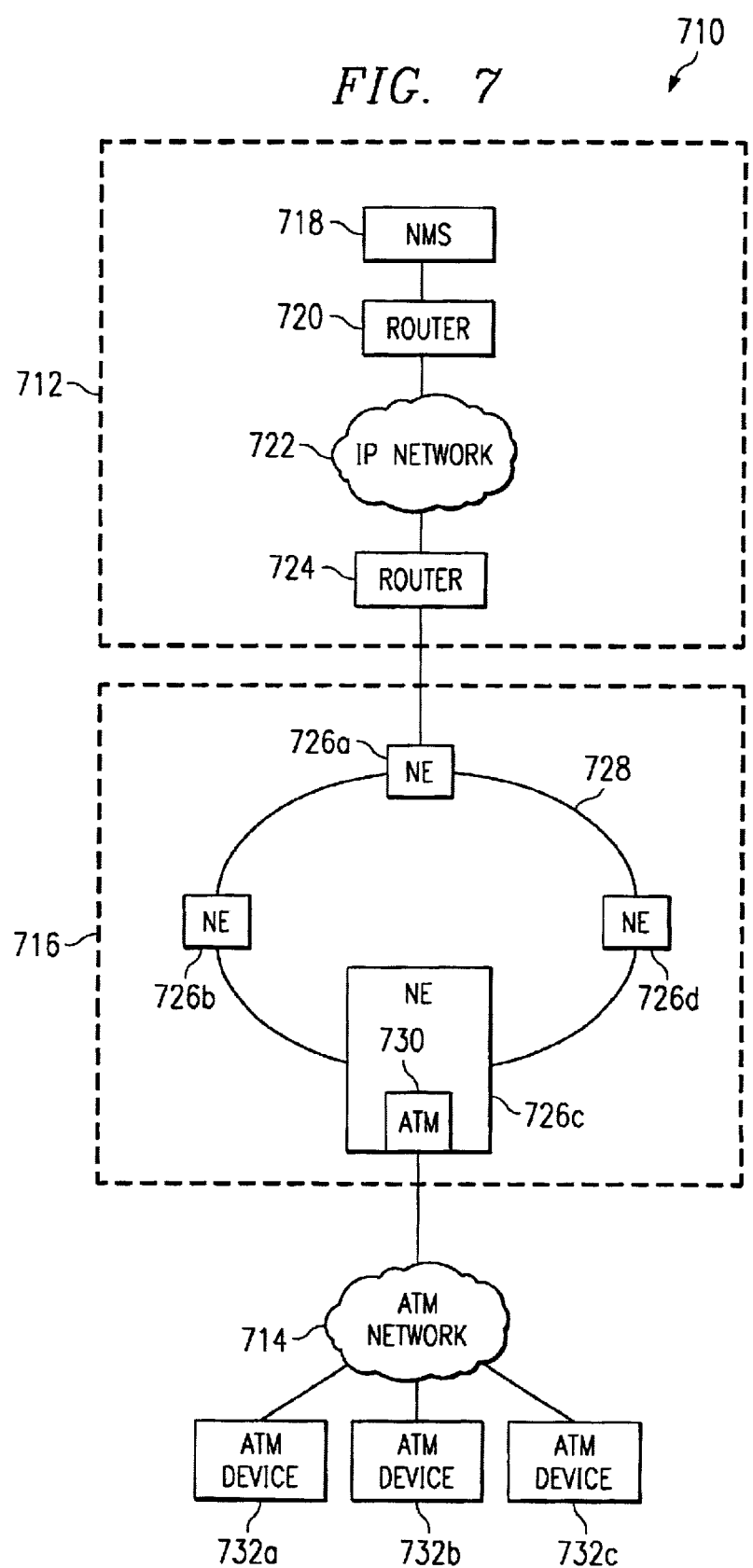
FIG. 7 is a block diagram illustrating another communications system for transporting packet-switched traffic in an optical network in accordance with one embodiment of the invention.

FIG. 7 is a block diagram illustrating another communications system 710 for transporting packet-switched traffic in an optical network 716 in accordance with one embodiment of the invention. In the illustrated embodiment, system 710 includes a packet-switched network 712, an Asynchronous Transfer Mode (ATM) network 714, and an optical network 716. Other embodiments of system 710 may be used without departing from the scope of the present invention.

In the illustrated embodiment, packet-switched network 712 includes a network management station 718, a first router 720, an IP network 722, and a second router 726. Network management station 718 may be the same or similar to network management station 18 of FIG. 1. IP network 722 is coupled to router 720 and router 724. IP network 722 transports IP packets between different network addresses in IP network 722. For example, IP network 722 may transport IP packets containing management information between routers 720 and 724. IP network 722 may comprise any suitable packet network operable to transport data packets. In one embodiment, IP network 722 comprises a global communications system such as the Internet. Other embodiments of IP network 722 may be used without departing from the scope of the present invention.

Routers 720 and 724 are coupled to IP network 722. Routers 720 and 724 are operable to receive and route IP packets over IP network 722. For example, router 720 may receive IP packets from network management system 718 and route the packets to router 724. Router 724 may receive IP packets from optical network 716 and route the packets to router 720. Routers 720 and 724 may comprise any hardware, software, firmware, or combination thereof operable to route IP packets over IP network 722.

In the illustrated embodiment, optical network 716 includes a plurality of network elements 726a–726d coupled by communication links 728. Network elements 726 may be the same or similar to network elements 24 of FIG. 3. Network element 726c further includes an ATM interface 730.

ATM interface 730 may, for example, comprise one of local interfaces 202 in network element 24 of FIG. 3. ATM interface 730 facilitates communication over ATM network 714. This may include, for example, receiving IP packets that have been tunneled through optical network 16 and placing the IP packets in ATM cells for communication over ATM network 714. This may also include receiving ATM cells containing IP packets and extracting the IP packets. ATM interface 730 may comprise any hardware, software, firmware, or combination thereof operable to facilitate communication over ATM network 714.

In one aspect of operation, network elements 726a and 726c support the tunneling of IP packets between packet-switched network 712 and ATM network 714. Network element 726c is also operable to encapsulate IP packets in ATM cells and to extract IP packets from ATM cells. This may allow, for example, network management station 718 to perform IP-based management of ATM devices 732 coupled to ATM network 714.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for transporting packet-switched control traffic in an optical network, comprising:

receiving a packet-switched datagram comprising a destination address;

identifying a destination Open Systems Interconnection (OSI) address of a destination network element in the optical network based on the destination address of the datagram;

generating an OSI packet comprising the datagram and the destination OSI address; and transmitting the OSI packet on the optical network in an OSI channel of a Synchronous Optical Network (SONET) frame.

2. The method of claim 1, wherein identifying the destination OSI address of the destination network element based on the destination address of the datagram comprises accessing a table comprising a plurality of datagram addresses and a plurality of OSI addresses, each datagram address associated with one of the OSI addresses.

3. The method of claim 2, further comprising:

comparing the destination address of the datagram with at least one of the datagram addresses in the table;

identifying the datagram address in the table that matches the destination address of the datagram; and retrieving the OSI address associated with the matching datagram address in the table.

4. The method of claim 1, wherein the packet-switched datagram comprises an Internet Protocol (IP) packet.

5. The method of claim 4, wherein the IP packet is received in an Ethernet frame.

6. The method of claim 5, further comprising removing the IP packet from the Ethernet frame.

7. The method of claim 1, wherein the packet-switched datagram comprises an Asynchronous Transfer Mode (ATM) cell.

8. The method of claim 1, wherein the OSI channel comprises section data communications channel bytes D1, D2, and D3 in an overhead portion of the SONET frame.

9. The method of claim 1, further comprising:
  receiving a second OSI packet in the OSI channel, the second OSI packet comprising a second packet-switched datagram, the second packet-switched datagram comprising a second destination address;
  removing the second packet-switched datagram from the second OSI packet; and
  communicating the second packet-switched datagram toward the second destination address.

10. The method of claim 9, wherein the second packet-switched datagram comprises an IP packet, and wherein the second packet-switched datagram is communicated toward the second destination address in an Ethernet frame.

11. The method of claim 10, further comprising generating the Ethernet frame, the Ethernet frame including the second packet-switched datagram.

12. The method of claim 1, further comprising routing the OSI packet through an intermediate network element in the optical network to the destination network element based on the destination OSI address.

13. A network element for transporting packet-switched control traffic in an optical network, comprising:
  an interface operable to receive a packet-switched datagram comprising a destination address;
  a tunneling module coupled to the interface, the tunneling module operable to identify a destination Open Systems Interconnection (OSI) address of a destination network element in the optical network based on the destination address of the datagram, the tunneling module also operable to generate an OSI packet comprising the datagram and the destination OSI address; and
  an optical interface coupled to the tunneling module and operable to transmit the OSI packet on the optical network in an OSI channel of a Synchronous Optical Network (SONET) frame.

14. The network element of claim 13, wherein the tunneling module is operable to identify the destination OSI address of the destination network element based on the destination address of the datagram by accessing a table comprising a plurality of datagram addresses and a plurality of OSI addresses, each datagram address associated with one of the OSI addresses.

15. The network element of claim 14, wherein the tunneling module is further operable to:
  compare the destination address of the datagram with at least one of the datagram addresses in the table;
  identify the datagram address in the table that matches the destination address of the datagram; and
  retrieve the OSI address associated with the matching datagram address in the table.

16. The network element of claim 13, wherein the packet-switched datagram comprises an Internet Protocol (IP) packet.

17. The network element of claim 16, wherein the interface comprises an Ethernet interface, and wherein the IP packet is received in an Ethernet frame.

18. The network element of claim 13, wherein the packet-switched datagram comprises an Asynchronous Transfer Mode (ATM) cell.

19. The network element of claim 13, wherein the OSI channel comprises section data communications channel bytes D1, D2, and D3 in an overhead portion of the SONET frame.

20. The network element of claim 13, wherein:
  the optical interface is further operable to receive a second OSI packet in the OSI channel, the second OSI packet comprising a second packet-switched datagram, the second packet-switched datagram comprising a second destination address;
  the tunneling module is further operable to remove the second packet-switched datagram from the second OSI packet; and
  the interface is further operable to communicate the second packet-switched datagram toward the second destination address.

21. A network element for transporting packet-switched control traffic in an optical network, comprising:
  an interface operable to receive a packet-switched datagram comprising a destination address;
  logic stored on at least one computer processable medium, the logic operable to:
    identify a destination Open Systems Interconnection (OSI) address of a destination network element in the optical network based on the destination address of the datagram; and
    generate an OSI packet comprising the datagram and the destination OSI address; and
  an optical interface operable to transmit the OSI packet on the optical network in an OSI channel of a Synchronous Optical Network (SONET) frame.

22. The network element of claim 21, wherein the logic is operable to identify the destination OSI address of the destination network element based on the destination address of the datagram by accessing a table comprising a plurality of datagram addresses and a plurality of OSI addresses, each datagram address associated with one of the OSI addresses.

23. The network element of claim 22, wherein the logic is further operable to:
  compare the destination address of the datagram with at least one of the datagram addresses in the table;
  identify the datagram address in the table that matches the destination address of the datagram; and
  retrieve the OSI address associated with the matching datagram address in the table.

24. The network element of claim 21, wherein the packet-switched datagram comprises an Internet Protocol (IP) packet.

25. The network element of claim 24, wherein the interface comprises an Ethernet interface, and wherein the IP packet is received in an Ethernet frame.

26. The network element of claim 21, wherein the packet-switched datagram comprises an Asynchronous Transfer Mode (ATM) cell.

27. The network element of claim 21, wherein the OSI channel comprises section data communications channel bytes D1, D2, and D3 in an overhead portion of the SONET frame.

28. The network element of claim 21, wherein:
  the optical interface is further operable to receive a second OSI packet in the OSI channel, the second OSI packet comprising a second packet-switched datagram, the second packet-switched datagram comprising a second destination address;

the logic is further operable to remove the second packet-switched datagram from the second OSI packet; and the interface is further operable to communicate the second packet-switched datagram toward the second destination address.

29. A propagated signal, comprising:

a transmission medium; and a Synchronous Optical Network (SONET) frame carried on the transmission medium, the SONET frame comprising:

a payload;

an overhead comprising an Open Systems Interconnection (OSI) channel; and an OSI packet in the OSI channel, the OSI packet comprising a destination OSI address and a packet-switched datagram.

30. The propagated signal of claim 29, wherein the transmission medium comprises a fiber optic cable.

31. The propagated signal of claim 29, wherein the OSI channel comprises section data communications channel bytes D1, D2, and D3 in the overhead.

32. The propagated signal of claim 29, wherein the packet-switched datagram comprises an Internet Protocol (IP) packet.

33. The propagated signal of claim 29, wherein the packet-switched datagram comprises an Asynchronous Transfer Mode (ATM) cell.

* * * * *